(12) United States Patent
Yokotani et al.

(10) Patent No.: US 6,577,122 B2
(45) Date of Patent: Jun. 10, 2003

(54) MAGNETIC DETECTION APPARATUS WITH MULTIPLE POLE PROJECTION GUIDE

(75) Inventors: Masahiro Yokotani, Tokyo (JP); Izuru Shinjo, Tokyo (JP); Takuji Nada, Tokyo (JP); Tatsuya Fukami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/902,721

(22) Filed: Jul. 12, 2001

(65) Prior Publication Data

US 2002/0101233 A1 Aug. 1, 2002

(30) Foreign Application Priority Data

Jan. 30, 2001 (JP) ........................................ 2001-021856

(51) Int. Cl.[7] .............................. G01B 7/30; G01D 5/12; G01P 3/488
(52) U.S. Cl. ............................ 324/207.21; 324/207.12; 324/207.25; 324/174
(58) Field of Search .................... 324/207.12, 207.2, 324/207.21, 207.22, 207.25, 173, 174, 252

(56) References Cited

U.S. PATENT DOCUMENTS 4,612,502 A * 9/1986 Spies ..................... 324/207.22
4,935,698 A * 6/1990 Kawaji et al. ............ 324/207.2
6,064,198 A * 5/2000 Wolf et al. ............... 324/207.2
6,111,403 A * 8/2000 Yokotani et al. ........ 324/207.21

FOREIGN PATENT DOCUMENTS

DE 2745880 C2 4/1978
DE 4025837 A1 2/1992
DE 19850677 A1 11/1999

* cited by examiner

Primary Examiner—Gerard R. Strecker
(74) Attorney, Agent, or Firm—Sughrue Mion, PLLC

(57) ABSTRACT

A magnetic detection apparatus is able to ensure good performance in detecting the position of a detected portion even with a shift or displacement in the position of a magnetoelectric conversion element. The magnetic detection apparatus includes at least one magnetoelectric conversion element 15 disposed to face one of teeth 12a and grooves 12b of a rotating member 11, a magnet 14 with a direction of magnetization thereof oriented in a direction perpendicular to a radial direction of the rotating member 11 in which the magnet 14 faces the rotating member 11, and a magnetic guide 21 having a first pole projection 21a and a second pole projection 21b formed in a spaced apart relation with respect to each other in a radial direction of the magnetic moving object in which the magnetic guide 21 faces one of the teeth 21a and the grooves 21b of the rotating member 11. The at least one magnetoelectric conversion element is disposed between the first and second pole projections when viewed from a direction perpendicular to the radial direction of the magnetic moving object in which the magnetic guide faces one of the teeth 21a and the grooves 21b of the rotating member 11.

7 Claims, 20 Drawing Sheets

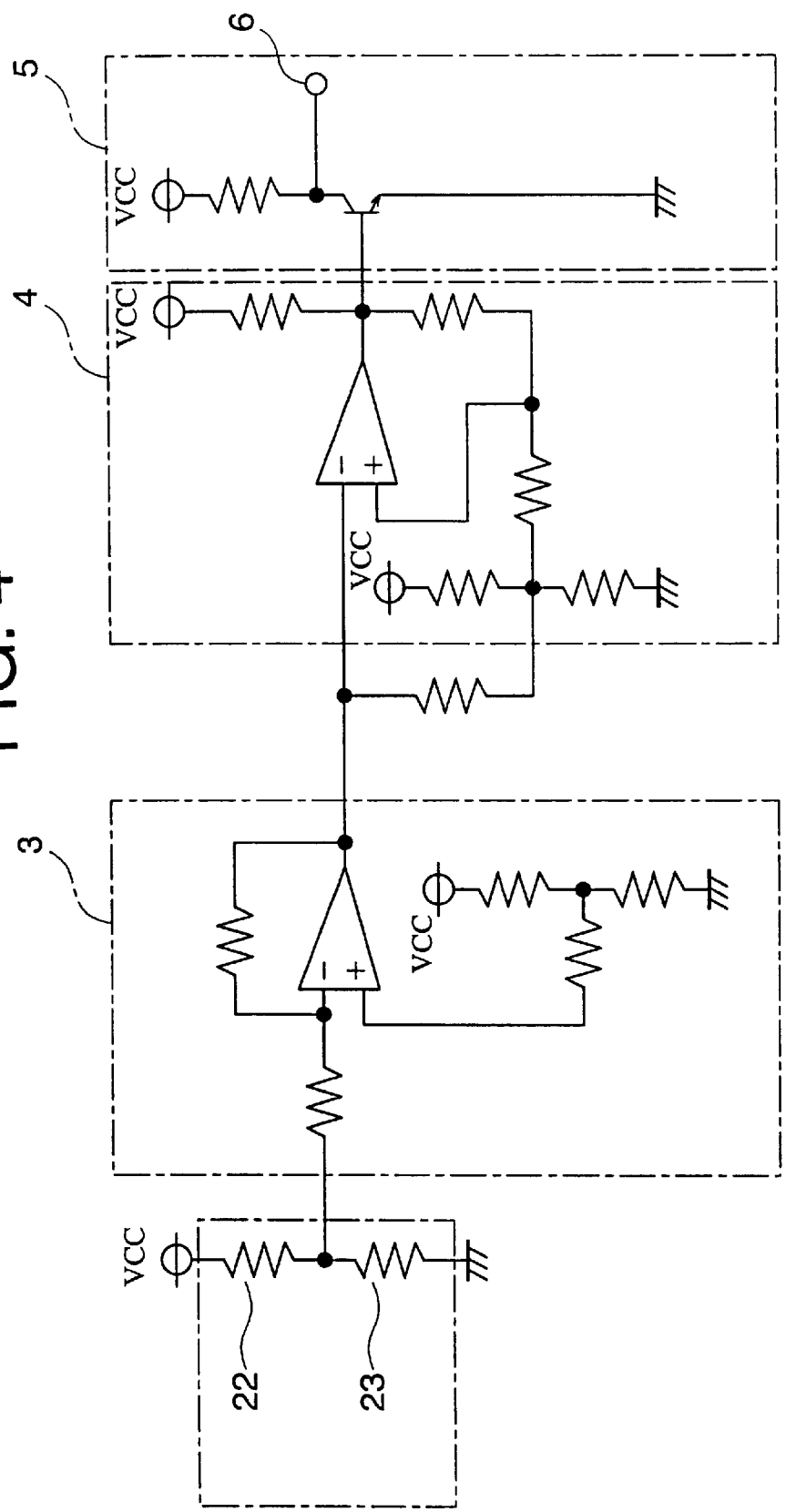

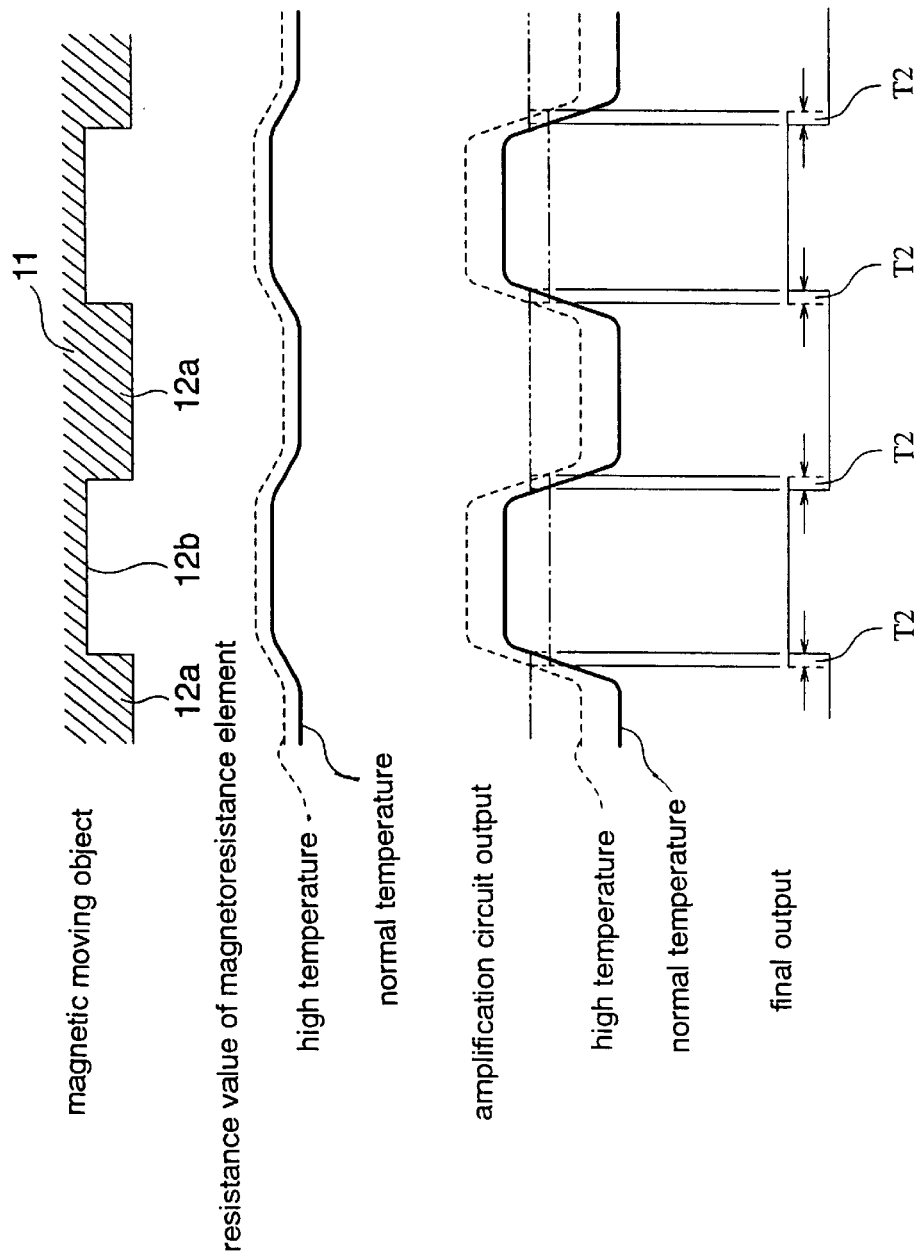

FIG. 6A
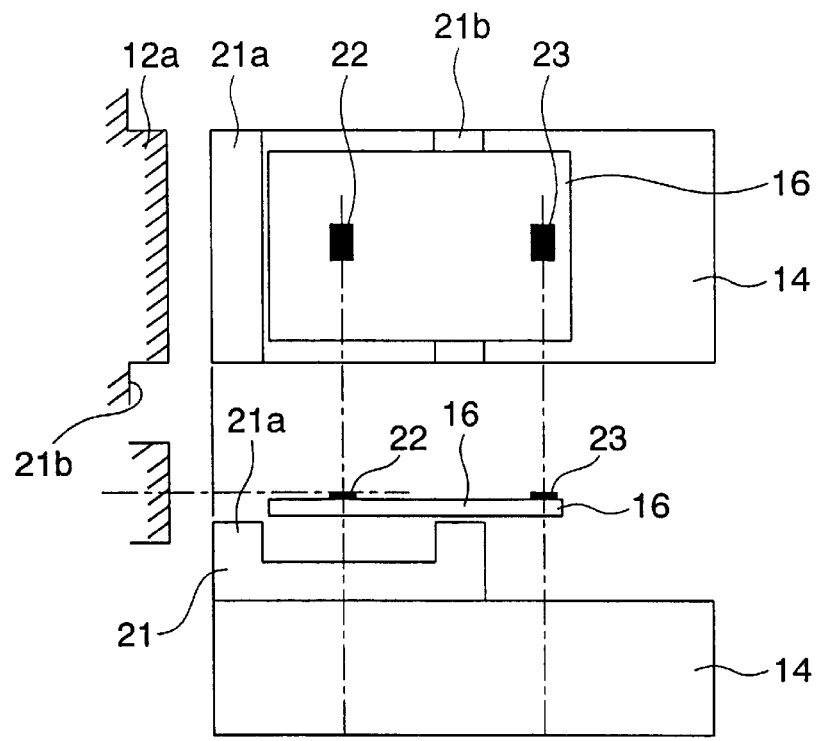
FIG. 6B
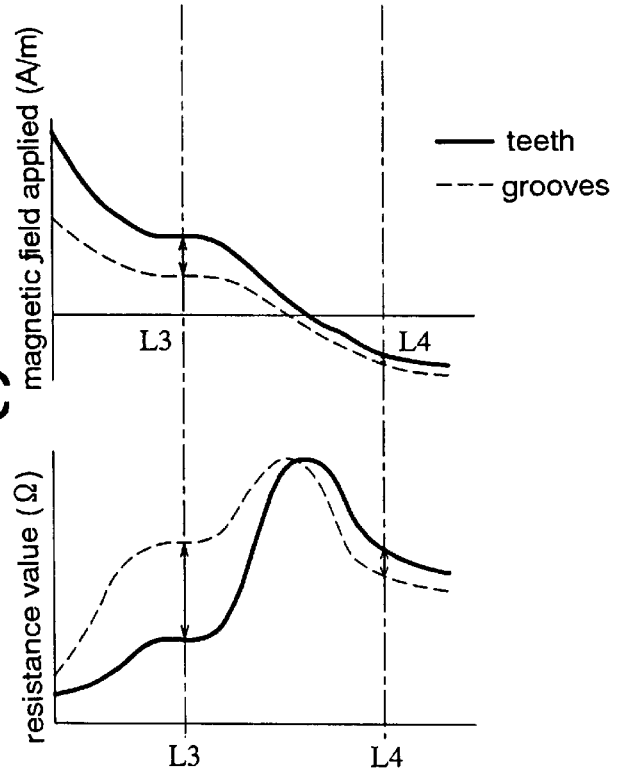
FIG. 6C

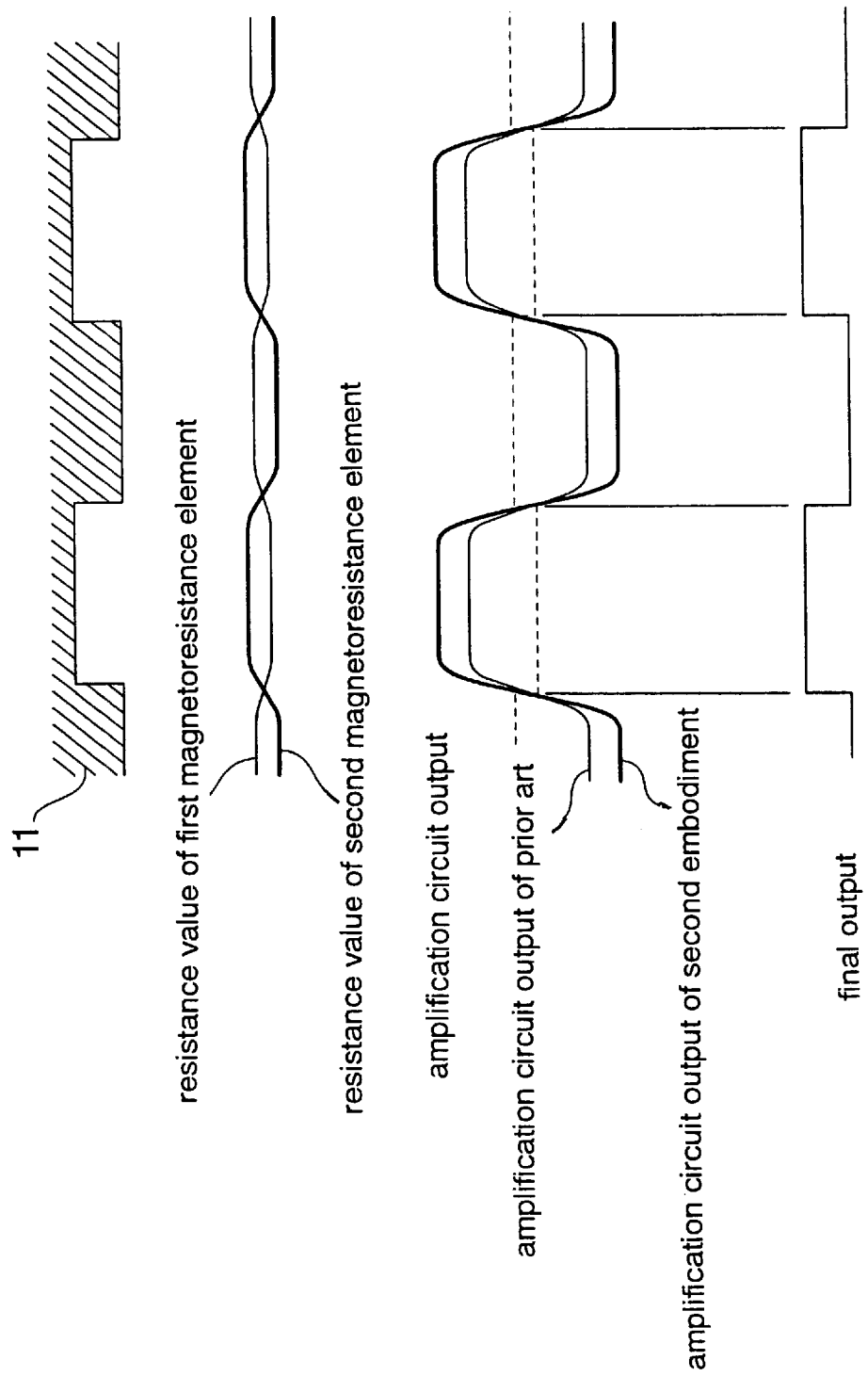

FIG. 8A
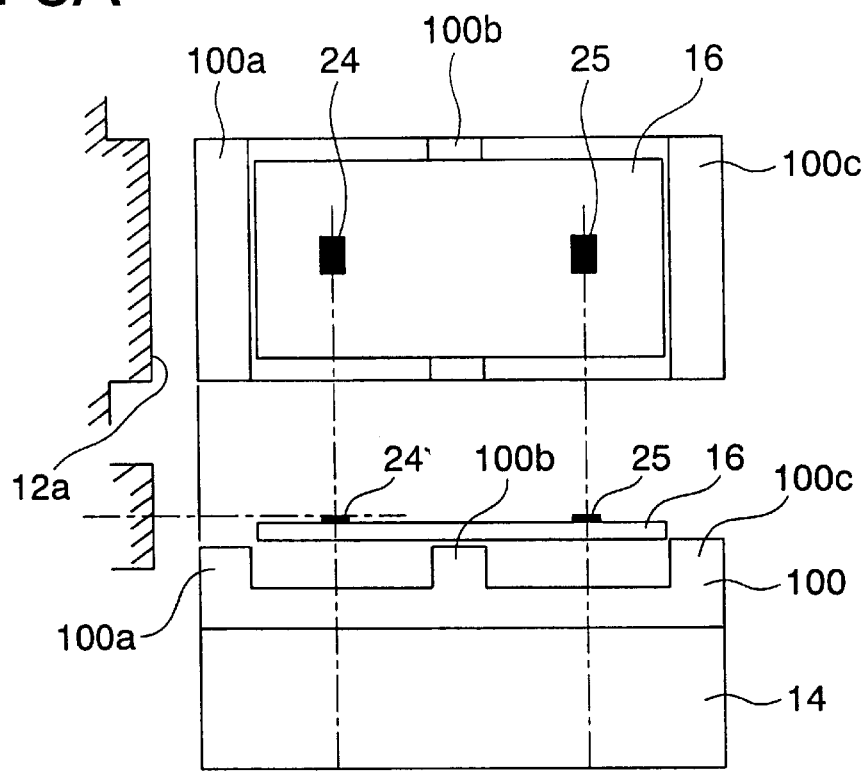
FIG. 8B
FIG. 8C
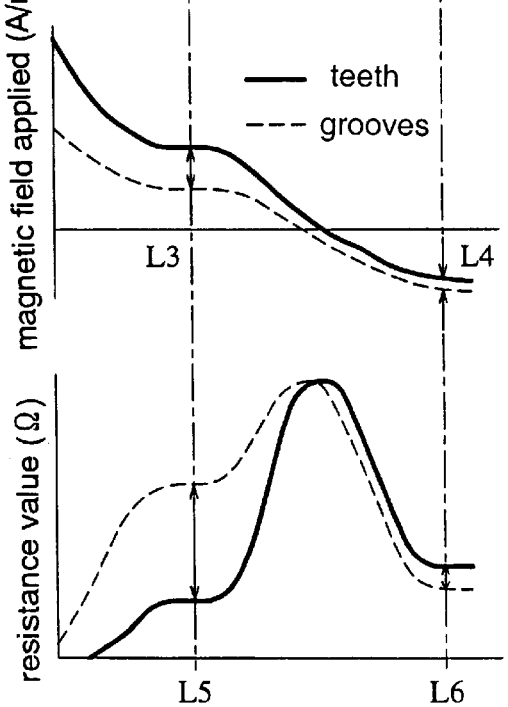

in case of M - N > 0

—— teeth
--- grooves in case of M - N = 0 in case of M - N < 0

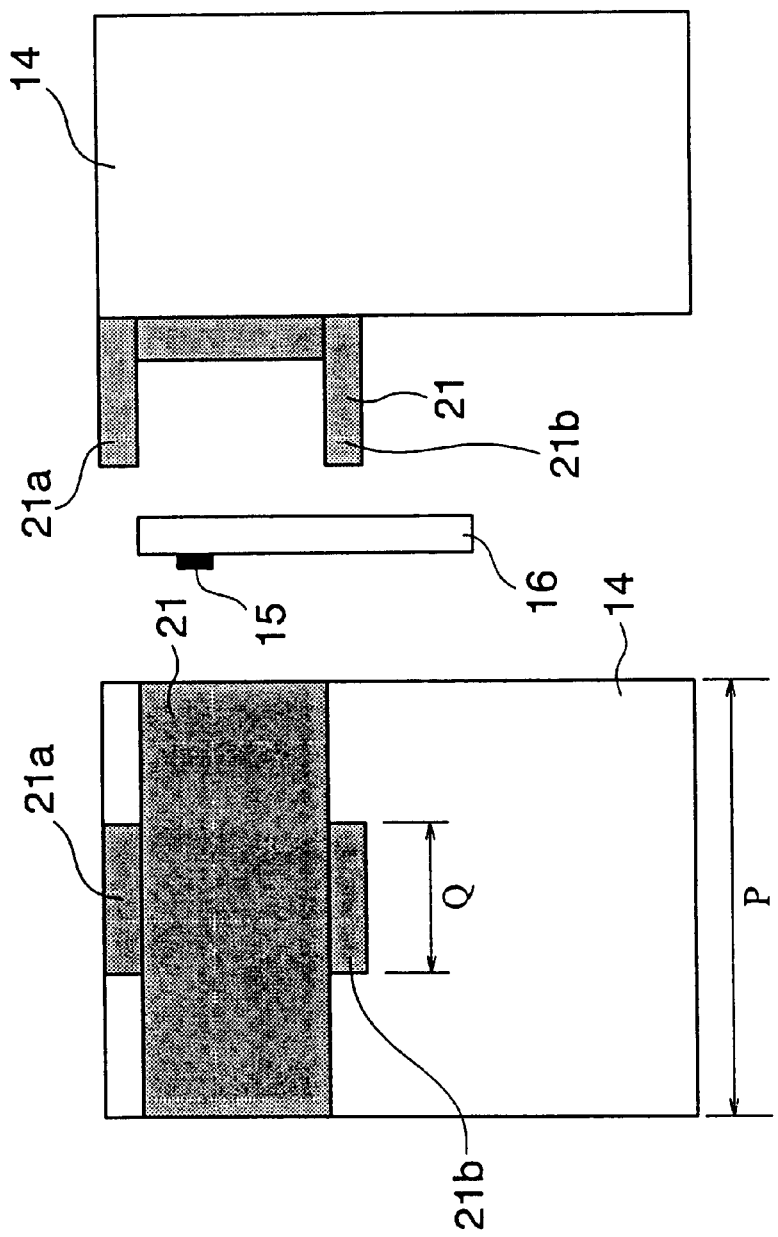

MR loop characteristic

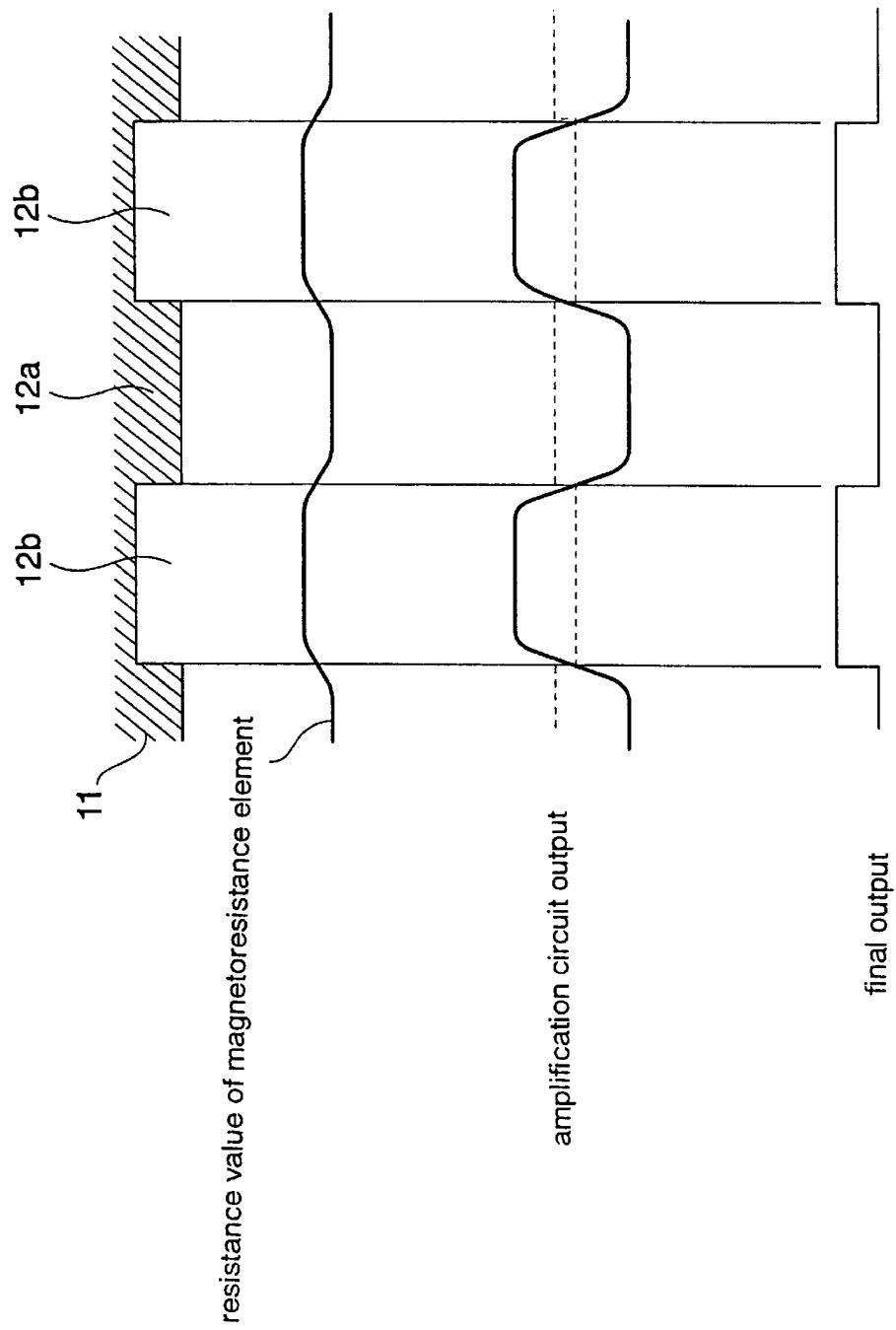

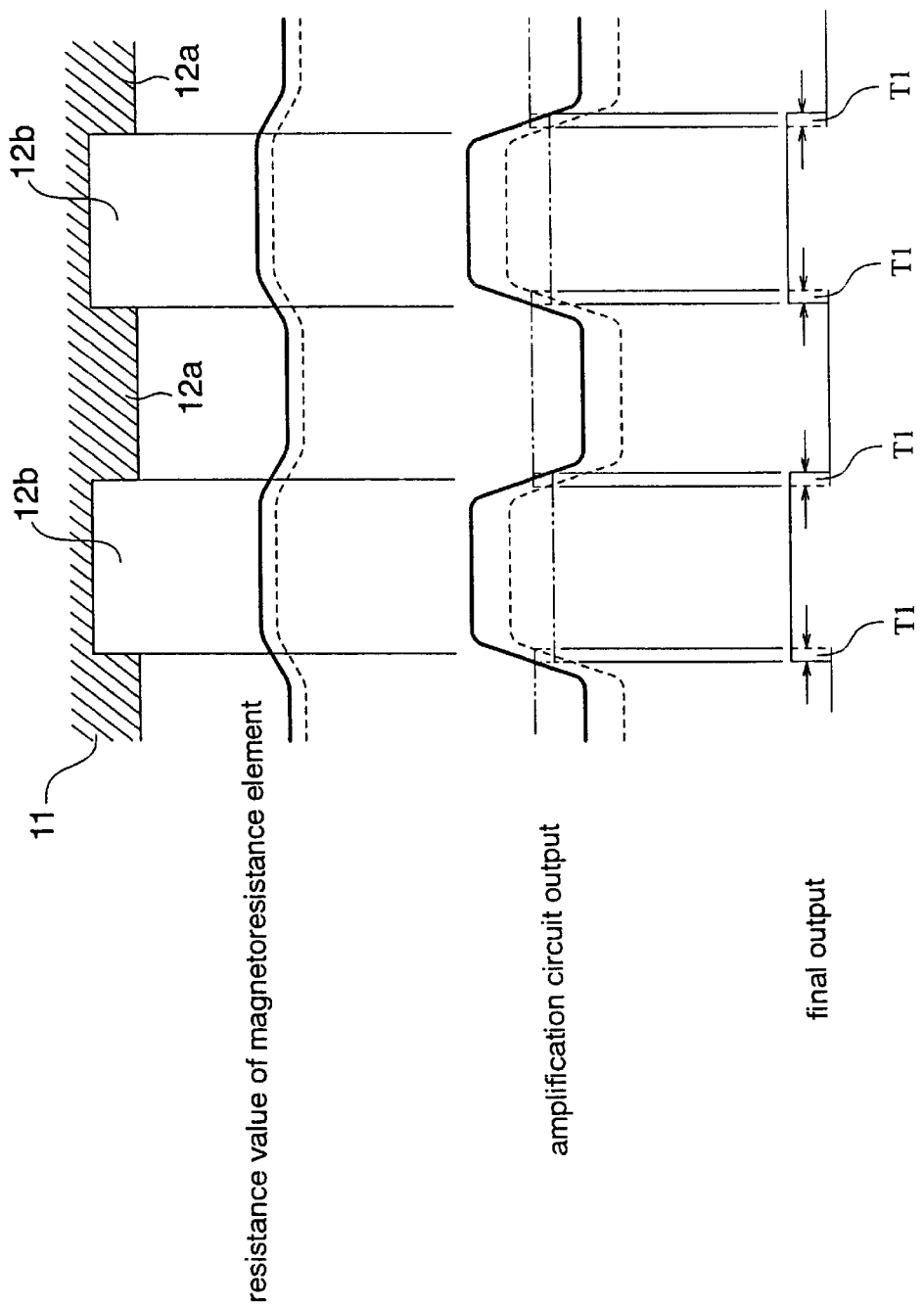

MAGNETIC DETECTION APPARATUS WITH MULTIPLE POLE PROJECTION GUIDE

This application is based on Application No. 2001-021856, filed in Japan on Jan. 30, 2001, the contents of which are hereby incorporated by reference.

BACKGROUND OF THE INVENTION

1. Field of the Invention

The present invention relates to a magnetic detection apparatus for detecting the strength of a magnetic field to find the position of a magnetic moving object.

2. Description of the Related Art

A typical example of such a magnetic detection apparatus has been known which is constructed as follows, for instance; magnetoelectric conversion elements in the form of magnetoresistance elements having electrodes formed at their respective ends are coupled with one another to provide a bridge circuit with a power supply of a constant voltage and a constant current connected with two opposed electrodes of the bridge circuit, so that a change in the resistance value of each magnetoresistance element is converted into a corresponding voltage change, which is then detected as a change in the magnetic field acting on each magnetoresistance element to thereby find the position of a magnetic moving object.

FIG. 16 is an electric circuit diagram of such a magnetic detection apparatus.

In this magnetic detection apparatus, a constant voltage is applied to a bridge circuit formed of a magnetoresistance element 1 and a fixed resistor 2, so that a change in the resistance of the magnetoresistance element 1 caused by a change in a magnetic field applied thereto is converted into a corresponding voltage change which is then amplified by an amplification circuit 3 and input to a comparison circuit 4. The signal input to the comparison circuit 4 is compared with a prescribed voltage so that it is converted into a final output signal of "0" or "1" by means of an output circuit 5. This final signal is output from an output terminal 6.

FIGS. 17A and 17B illustrate the arrangement of a known magnetic detection apparatus. FIG. 17A is a perspective view thereof, and FIG. 17B is a partial plan view of FIG. 17A.

This magnetic detection apparatus is arranged in opposition to one of detected portions in the form of teeth 12a and grooves 12b of a magnetic moving object in the form of a rotating member 11.

The known magnetic detection apparatus includes a magnetoelectric conversion element in the form of a magnetoresistance element 15 having a magnetic resistance value which varies with a change in a magnetic field applied thereto, a magnet 14 with the direction of magnetization thereof oriented to the rotating member 11, the amplification circuit 3 for amplifying a signal in the form of a voltage change converted from a change in the resistance value of the magnetoresistance element 15, and a processing circuit 16 incorporating therein the comparison circuit 4 and the output circuit 5.

With the magnetic detection apparatus as constructed above, the rotating member 11 is caused to rotate in synchronization with the rotation of a rotation shaft 10, so that a magnetic field applied to the magnetoresistance element 15 from the magnet 14 is accordingly varied. As a result, the resistance value of the magnetoresistance element 15 changes between the time when a tooth 12a of the rotating member 11 comes to face the magnetoresistance element 15 and the time when a groove 12b of the rotating member 11 comes to face the magnetoresistance element 15, as illustrated in FIG. 18. Thus, the output of the amplification circuit 3 also changes accordingly. Then, the output of the amplification circuit 3 is waveform shaped by means of the processing circuit 16, so that the output terminal 6 of the processing circuit 16 generates a final output signal of "1" or "0" corresponding to a tooth 12a or a groove 12b of the rotating member 11.

FIGS. 19A through 19C illustrate a change in a bias magnetic field applied to the magnetoresistance element 15 by the magnet 14 when the magnetoresistance element 15 is shifted or displaced from a predetermined position with respect to an opposed tooth 12a or an opposed groove 12b of the rotating member 11 in a radial direction thereof (i.e., in a rotating member facing direction, as indicated at arrow B, in which the magnetoresistance element 15 faces the rotating member 11), and when the magnetoresistance element 15 is shifted or displaced from the predetermined position with respect to an opposed tooth 12a and an opposed groove 12b of the rotating member 11 in a circumferential direction thereof (i.e., in a direction as indicated at arrow A). From FIG. 19C, it can be seen that the bias magnetic field changes more greatly when the magnetoresistance element 15 is displaced in the direction of arrow B, i.e., in a radial direction of the rotating member 11, than when the magnetoresistance element 15 is displaced in the direction of arrow A, i.e., in a circumferential direction of the rotating member 11.

FIG. 20 illustrates the respective operation waveforms of the resistance value of the magnetoresistance element 15, the output of the amplification circuit 3 and the final output of the output terminal 6 when the magnetoresistance element 15 is displaced in the direction of arrow B with respect to the detected portions in the form of the teeth 12a and the grooves 12b of the rotating member 11. In this figure, solid lines represent the operation waveforms when the magnetoresistance element 15 is in a normal position; dotted lines represent the operation waveforms when the magnetoresistance element 15 is out of the normal position; and alternate long and two short dashes lines represent comparison voltages.

As can be seen from this figure, the timing of position detection of a tooth 12a or a groove 12b of the rotating member 11 shifts by a period of time T1 when the magnetoresistance element 15 is displaced from its normal position. As a result, there arises a problem that the position of a tooth 12a or a groove 12b is not able to be detected accurately by a positional shift or displacement of the magnetoresistance element 15.

SUMMARY OF THE INVENTION

The present invention is intended to obviate the problem as referred to above, and has for its object to provide a magnetic detection apparatus which is capable of ensuring good-performance in detecting the position of a detected portion even if there is a shift or displacement in the position of a magnetoelectric conversion element.

Bearing the above object in mind, according to the present invention, there is provided a magnetic detection apparatus comprising: at least one magnetoelectric conversion element disposed to face a detected portion of a magnetic moving object; a magnet with a direction of magnetization thereof oriented in a direction perpendicular to a radial direction of the magnetic moving object in which the magnet faces the magnetic moving object; and a magnetic guide having at least two pole projections formed in a spaced apart relation with respect to each other in a radial direction of the magnetic moving object in which the magnetic guide faces the detected portion of the magnetic moving object. The at least one magnetoelectric conversion element is disposed between the pole projections when viewed from a direction perpendicular to the radial direction of the magnetic moving object in which the magnetic guide faces the detected portion of the magnetic moving object.

The above and other objects, features and advantages of the present invention will become more readily apparent to those skilled in the art from the following detailed description of preferred embodiments of the invention taken in conjunction with the accompanying drawings.

BRIEF DESCRIPTION OF THE DRAWINGS

FIGS. 1A through 1C illustrate the schematic arrangement of a magnetic detection apparatus according to a first embodiment of the present invention, in which FIG. 1A is a perspective view thereof; FIG. 1B is a top view thereof; and FIG. 1C is a side view thereof.

FIG. 4 is an electric circuit diagram of the magnetic detection apparatus shown in FIGS. 3A through 3C.

FIG. 5 is an operation waveform diagram of a magnetoresistance element in the prior art when the ambient temperature is normal (room temperature) and high.

FIG. 6A is a structural view of the magnetic detection apparatus shown in FIGS. 3A through 3C.

FIG. 6B is a characteristic view of a magnetic field in the magnetic detection apparatus of FIG. 6A.

FIG. 6C is a resistance characteristic view of a magnetoresistance element of the magnetic detection apparatus of FIG. 6A.

FIG. 7 is an operation waveform diagram of the magnetic detection apparatus according to the second embodiment.

FIG. 8A is a structural view of a magnetic detection apparatus according to a third embodiment of the present invention.

FIG. 8B is a characteristic view of a magnetic field in the magnetic detection apparatus according to the third embodiment.

FIG. 8C is a resistance characteristic view of a magnetoresistance element of the magnetic detection apparatus according to the third embodiment.

FIGS. 10A and 10B illustrate the arrangement of a magnetic detection apparatus according to a fifth embodiment of the present invention, in which FIG. 10A is a plan view thereof, and FIG. 10B is a side view thereof.

FIGS. 13A and 13B illustrate the arrangement of a magnetic detection apparatus according to a sixth embodiment of the present invention, in which FIG. 13A is a plan view thereof, and FIG. 13B is a side view thereof.

FIGS. 17A and 17B illustrate the arrangement of the magnetic detection apparatus of FIG. 16, in which FIG. 17A is a perspective view thereof, and FIG. 17B is a partial plan view thereof.

FIG. 18 is an operation waveform diagram of the magnetic detection apparatus of FIG. 16.

FIG. 20 is an operation waveform diagram of the magnetic detection apparatus of FIG. 19A.

DESCRIPTION OF THE PREFERRED EMBODIMENTS

Now, preferred embodiments of the present invention will be described in detail while referring to the accompanying drawings. Throughout the following embodiments of the present invention, the same or corresponding members or parts as those in the aforementioned known apparatus are identified by the same symbols.

Embodiment 1

Figure 1A:
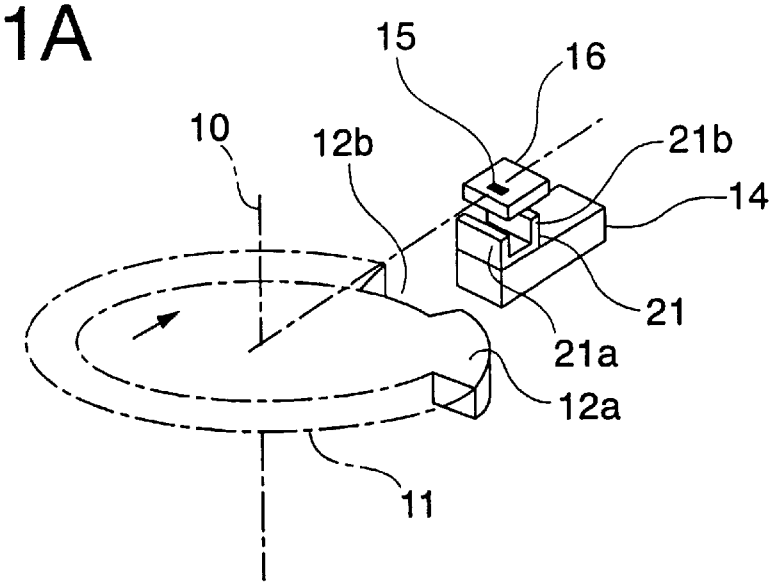
Figure 1C:
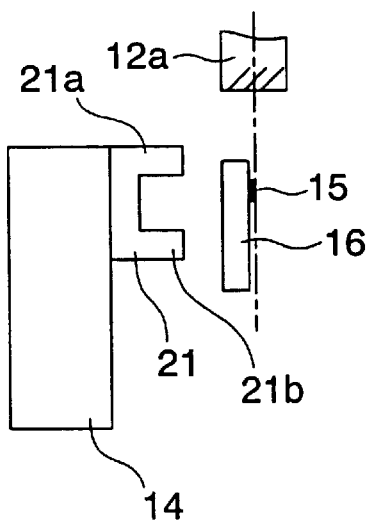
Figure 1B:
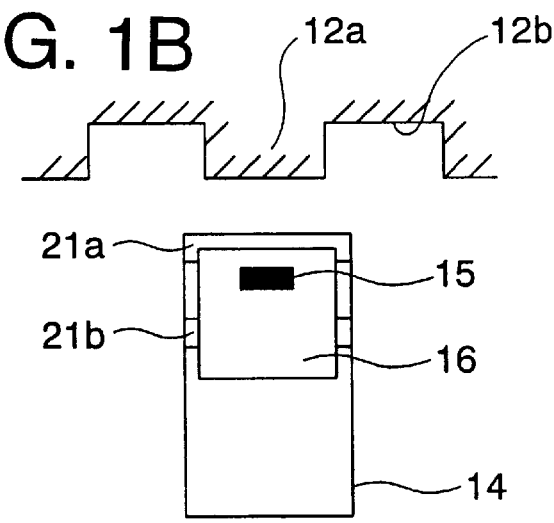

FIGS. 1A through 1C illustrate the arrangement of a magnetic detection apparatus according to a first embodiment of the present invention, in which FIG. 1A is a perspective view thereof; FIG. 1B is a top view thereof; and FIG. 1C is a side view thereof.

The magnetic detection apparatus is disposed in opposition to a detected portion in the form of teeth 12a and grooves 12b of a magnetic moving object in the form of a rotating member 11.

The magnetic detection apparatus includes a magnetoelectric conversion element in the form of a magnetoresistance element 15 having a magnetic resistance value varied in accordance with a change in a magnetic field applied thereto, a magnet 14 with the direction of magnetization thereof oriented in a direction perpendicular to a radial direction of the rotating member 11 in which the magnet 14 faces the rotating member 11, a magnetic guide 21 formed of iron and having a first pole projection 21a and a second pole projection 21b formed in a spaced apart relation with respect to each other in a radial direction of the rotating member 11 in which the magnetic guide 21 faces a tooth 12a or a groove of the rotating member 11, an amplification circuit 3 (see FIG. 4) for amplifying a signal of a voltage change converted from a change in the magnetic resistance value of the magnetoresistance element 15, and a processing circuit 16 incorporating therein a comparison circuit 4 and an output circuit 5 (see FIG. 4).

The magnetoresistance element 15 is disposed between the first pole projection 21a and the second pole projection 21b when viewed along a rotation shaft or axis 10 perpendicular to a rotating member facing direction A (i.e., a radial direction of the rotating member 11).

Figure 2A:
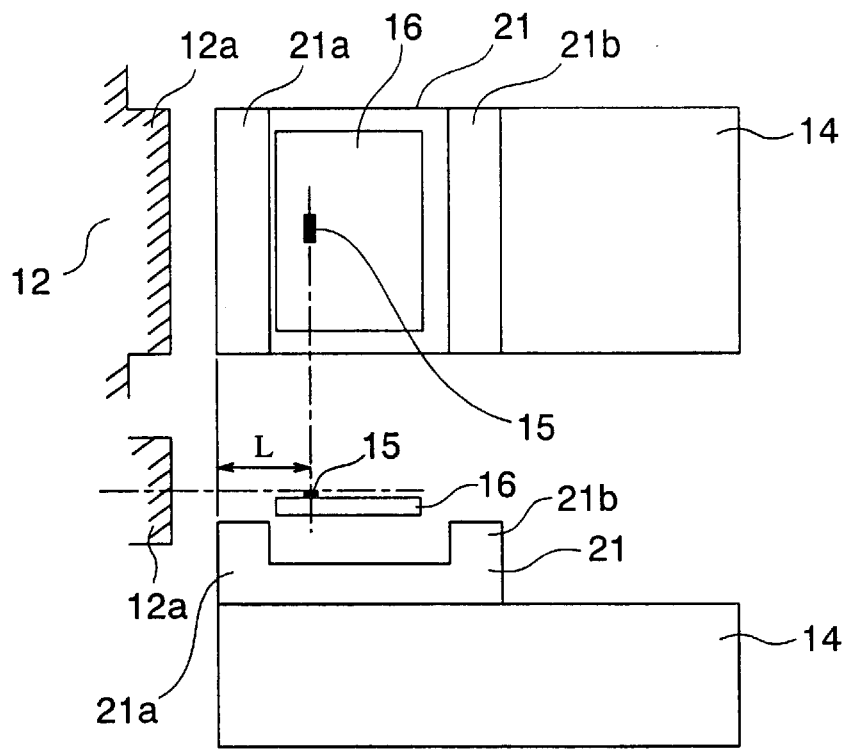
FIG. 2A is a structural view of the magnetic detection apparatus of FIG. 1.
Figure 2B:
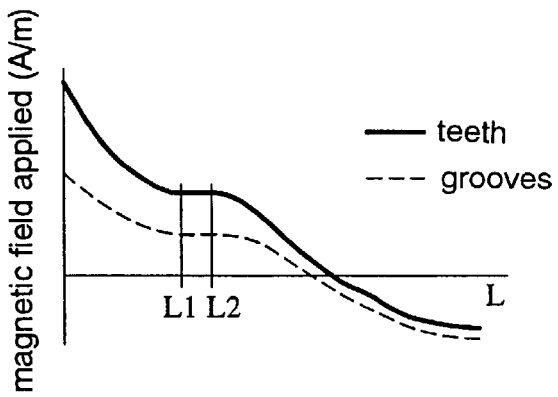
FIG. 2B is a characteristic view of a magnetic field in the magnetic detection apparatus of FIG. 2A.
Figure 2C:
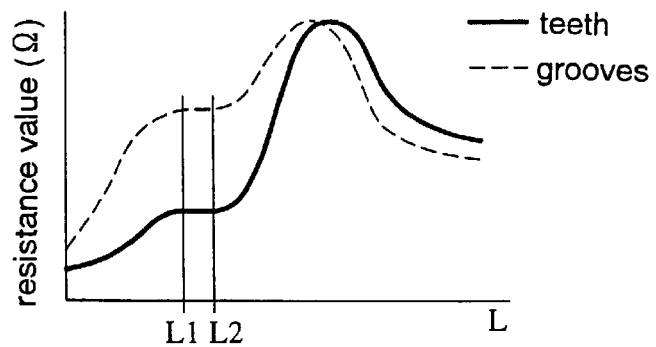
FIG. 2C is a resistance characteristic view of a magnetoresistance element of the magnetic detection apparatus of FIG. 2A.

FIG. 2A illustrates an arrangement in which the magnetoresistance element 15 is disposed at a position spaced a distance L from a tip or inner end (i.e., an end adjacent a radially outer surface of the rotating member 11) of the magnet 14 in a radial direction of the rotating member 11. FIG. 2B and FIG. 2C illustrate the strength of a magnetic field applied to the magnetoresistance element 15 and the resistance value thereof, respectively, when the magnetic guide 21 is placed in opposition to a tooth 12a and a groove 12b of the rotating member 11.

As can be seen from FIG. 2, there exists a position of the magnetoresistance element 15 in which there is almost no or little change in a bias magnetic field applied to the magnetoresistance element 15 in the range of from L1 to L2. When the magnetoresistance element 15 is disposed at this position, the position detection performance of the apparatus is substantially unaffected even if the position of the detecting member 20 is displaced to a more or less extent in a radial direction of the rotating member 11.

The range of from L1 to L2 is a range or distance between the first pole projection 21a and the second pole projection 21b. The reason for this is considered as follows: the magnetic flux is liable to be concentrated on the first pole projection 21a and the second pole projection 21b, and hence the magnetic field is able to be made accordingly uniform between the first pole projection 21a and the second pole projection 21b.

Since in this first embodiment, the magnetoresistance element 15 is disposed in the range of from L1 to L2, it is possible to ensure good performance in detecting the position of a tooth 12a or a groove 12b even if the magnetoresistance element 15 is shifted or displaced somewhat in the rotating member facing direction, i.e., in a radial direction of the rotating member 11.

Embodiment 2

Figure 3A:
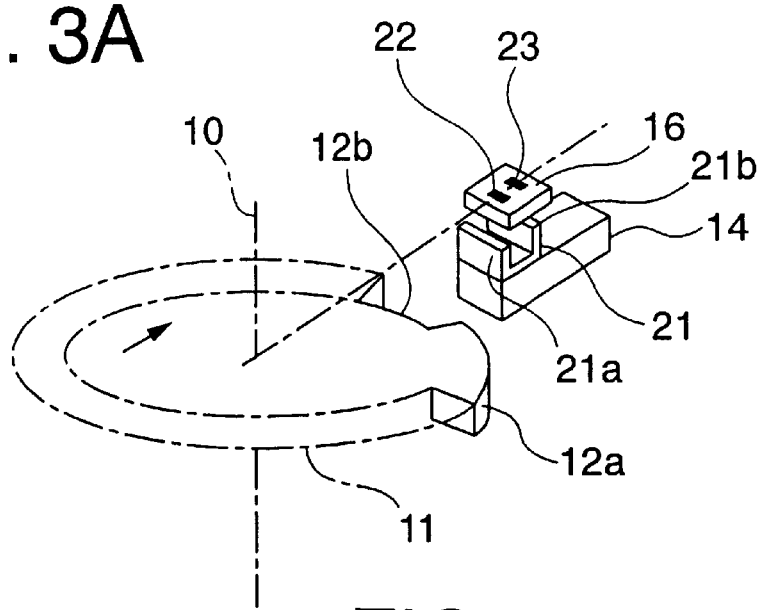
FIG. 3A is a perspective view of a magnetic detection apparatus according to a second embodiment of the present invention.
Figures 3B, 3C:
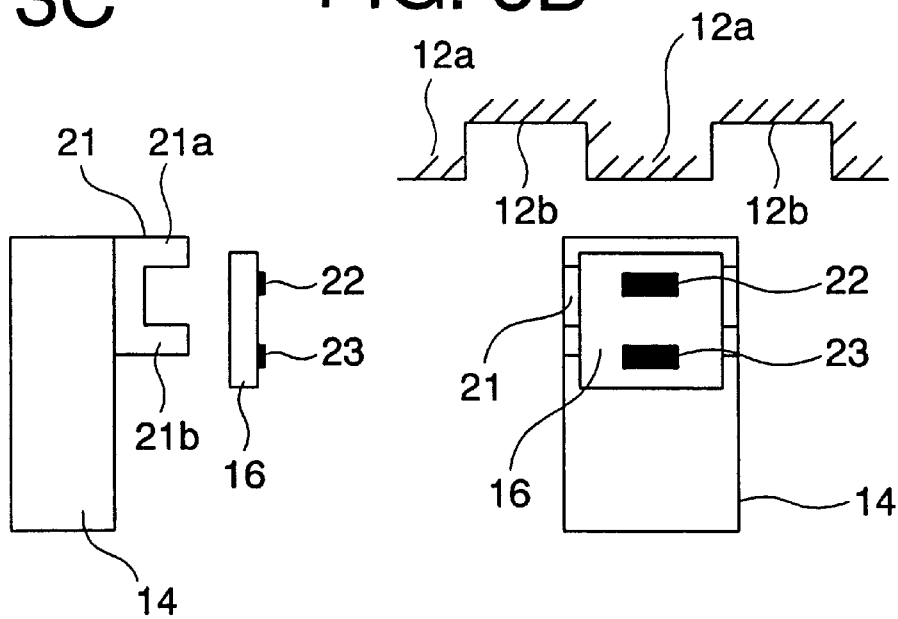
FIG. 3B is a top view of the magnetic detection apparatus according to the second embodiment.
FIG. 3C is a side view of the magnetic detection apparatus according to the second embodiment.

FIGS. 3A and 3B illustrate the arrangement of a magnetic detection apparatus according to a second embodiment of the present invention. FIG. 3A is a perspective view thereof; FIG. 3B is a top view thereof; and FIG. 3C is a side view thereof. FIG. 4 is an electric circuit diagram thereof.

In this second embodiment, a first magnetoresistance element 22 is disposed between the first pole projection 21a and the second pole projection 21b of the magnetic guide 21. A second magnetoresistance element 23 is disposed radially outside of the second pole projection 21b on a side remote from the rotating member 11.

FIG. 5 illustrates the operation waveforms of the magnetoresistance element 1 in the prior art when the ambient temperature is normal (i.e., room temperature) and high, respectively. In this figure, solid lines represent the operation waveforms of the magnetoresistance element 1 at the normal temperature; dotted lines represent the operation waveforms of the magnetoresistance element 1 at a high temperature; and alternate long and two short dashes lines represent a comparison voltage. As shown in FIG. 5, the operation waveform of the magnetoresistance element 1 shifts in accordance with a temperature change in the magnetic resistance of the magnetoresistance element 1. This is caused by a difference between the temperature coefficient of the magnetoresistance element 1 and that of the fixed resistor 2 which, in combination with the magnetoresistance element 1, constitutes a bridge circuit. As a result, the timing of detecting the position of a tooth 12a or a groove 12b shifts by a period of time T2, so that the detected position of a tooth 12a or a groove 12b also shifts greatly in accordance with the temperature change of the magnetoresistance element 1.

In contrast to this, in the second embodiment, the bridge circuit formed of the first magnetoresistance element 22 and the second magnetoresistance element 23 as depicted in FIG. 4 serves not only to cancel out the temperature coefficient characteristic of the magnetoresistance elements but also enlarge the amplitude of the output of the amplification circuit 3, as depicted in FIG. 7, thereby making it possible to improve the detection accuracy.

In addition, since the first magnetoresistance element 22 is disposed at a position L3 in which there is almost no or little change in the bias magnetic field and in the magnetic resistance of the first magnetoresistance element 22, as illustrated in FIGS. 6A through 6C, good performance in detecting the position of a tooth 12a or a groove 12b can be ensured even if the first magnetoresistance element 22 is shifted or displaced in the rotating member facing direction, i.e., in a radial direction of the rotating member 11. Here, note that though the second magnetoresistance element 23 is disposed at a position L4 on a radially outer side of the second or outer pole projection 21b, it may be disposed on a radially inner side of the first or inner pole projection 21a while attaining the substantially the same effects.

Embodiment 3

FIGS. 8A through 8C illustrate a magnetic detection apparatus according to a third embodiment of the present invention. FIG. 8A shows the arrangement of the magnetic detection apparatus of this embodiment; FIG. 8B represents the strength of a magnetic field applied to a first and a second magnetoresistance element 24 and 25; and FIG. 8C represents the resistance values of the first and second magnetoresistance elements 24 and 25.

In this third embodiment, a magnetic guide 100 has three pole projections 100a, 100b and 100c with magnetoresistance elements 24 and 25 being arranged between the pole projections 100a and 100b, and between the pole projections 100b and 100c, respectively. Also, the first magnetoresistance element 24 and the second magnetoresistance element 25 together form a bridge circuit.

In this embodiment, similar to the second embodiment, the temperature coefficient characteristic of the magnetoresistance elements can be canceled, and the amplitude of the output of the amplification circuit can be enlarged, thus improving the detection accuracy.

Moreover, since the second magnetoresistance element 25 is also disposed at a position L4 in which there is almost no or little change in the bias magnetic field and in the magnetic resistance of the second magnetoresistance element 25, better performance in detecting the position of a tooth 12a or a groove 12b can be ensured in comparison with the second embodiment even if the first and second magnetoresistance elements 24 and 25 are shifted or displaced in the rotating member facing direction, i.e., in a radial direction of the rotating member 11.

Embodiment 4

Figure 9A:
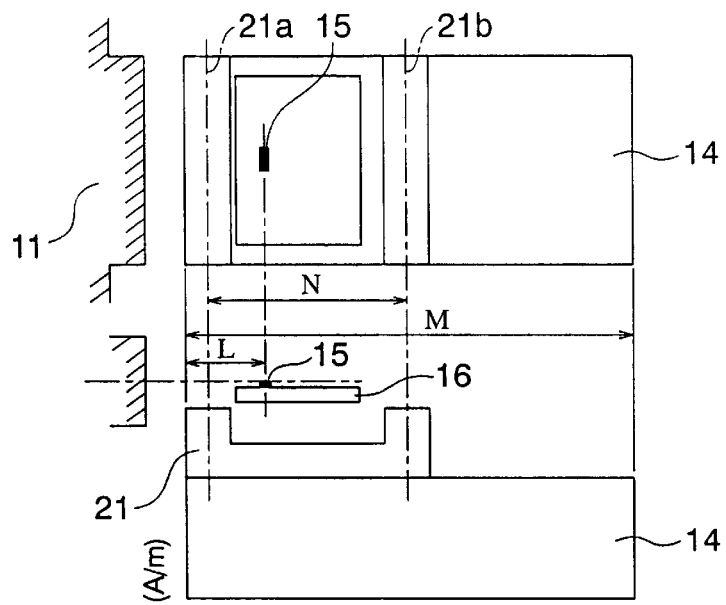
FIG. 9A is a structural view of a magnetic detection apparatus according to a fourth embodiment of the present invention.
Figure 9B:
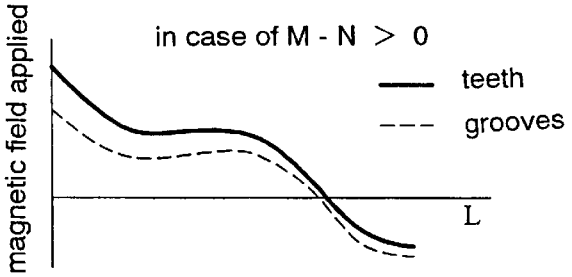
FIGS. 9B through 9D are characteristic views of a magnetic field in the magnetic detection apparatus of FIG. 9A when the length (M) of a magnet in a radial direction of a rotating member is changed with respect to a pitch (N) between adjacent pole projections of a magnetic guide.
Figure 9C:
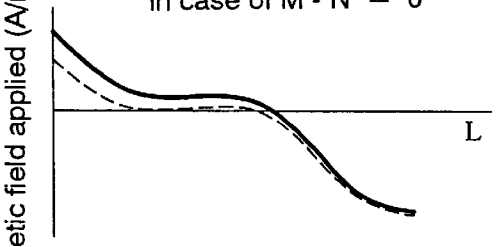
Figure 9D:
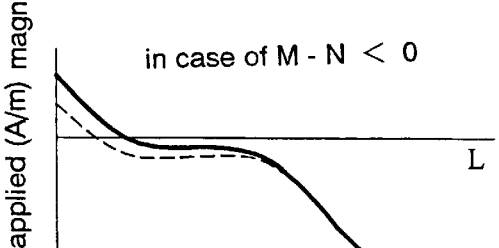

FIGS. 9A through 9C illustrate a magnetic detection apparatus according to a fourth embodiment of the present invention. FIG. 9A shows the arrangement of the magnetic detection apparatus of this embodiment, and FIGS. 9B through 9D represent the strength of a bias magnetic field applied to the magnetoresistance element 15 when the length (M) of the magnet 14 in the radial direction of the rotating member 11 is changed with respect to a pitch (N) between the pair of pole projections 21a and 21b of the magnetic guide 21.

In this embodiment, as can be seen from FIG. 9B, by enlarging the length (M) of the magnet 14 in the rotating member facing direction (i.e., in a radial direction of the rotating member 11) to a value equal to or greater than the pitch (N) between the pair of pole projections 21a and 21b, it is possible to reduce a change in the bias magnetic field applied to the magnetoresistance element 15 due to a shift or displacement in the position thereof in a radial direction of the rotating member 11. In addition, a great difference in the magnetic field applied to the magnetoresistance element 15 between a tooth 12a and a groove 12b can be obtained. Thus, even if the magnetoresistance element 15 is shifted or displaced in its position in the rotating member facing direction, the magnetoresistance element 15 can ensure much better performance in detecting the position of a tooth 12a or a groove 12b, improving the position detection accuracy.

Embodiment 5

Figure 11:
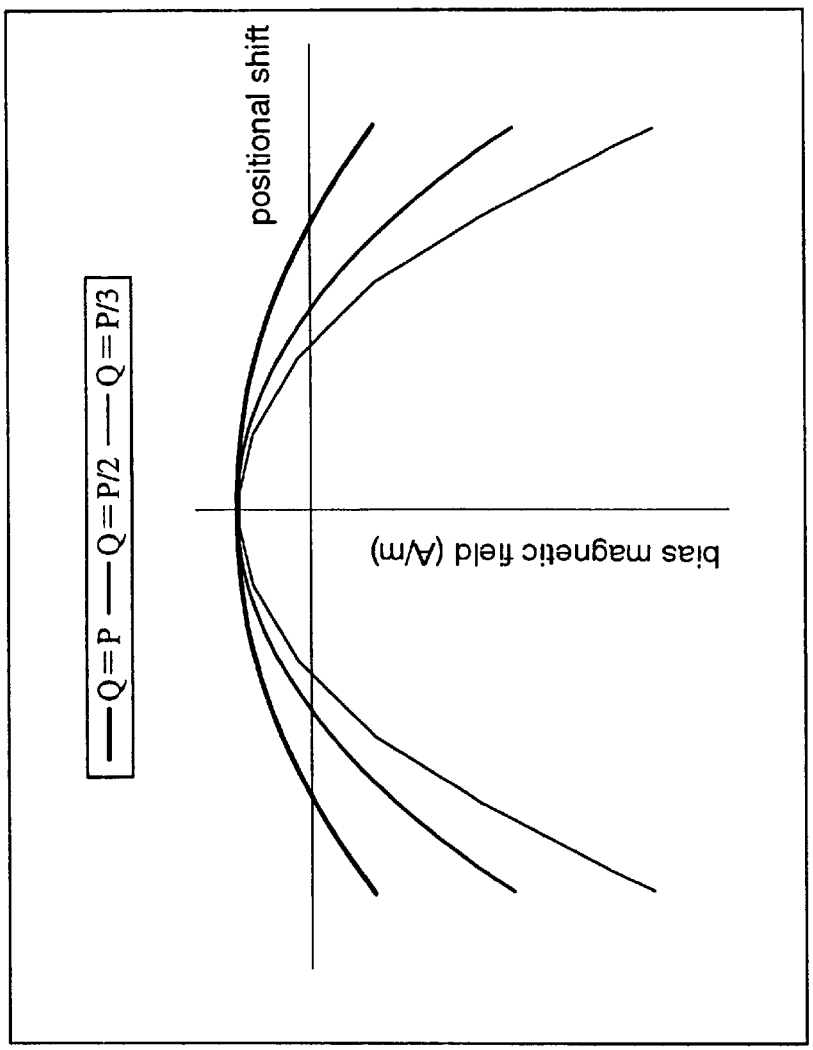
FIG. 11 is a view illustrating a relation between a shift or displacement in the position of the magnetic detection apparatus illustrated in FIGS. 10A and 10B and a magnetic field applied thereto.

FIGS. 10A and 10B illustrate the arrangement of a magnetic detection apparatus according to a fifth embodiment of the present invention. FIG. 10A is a plan view thereof and FIG. 10B is a side view thereof. FIG. 11 illustrates a bias magnetic field applied to the magnetoresistance element 15 when a width (Q) of the pair of pole projections 21a and 21b of the magnetic guide 21 is changed with respect to a width (P) of the magnet 14.

In this embodiment, as can be understood from FIG. 11, by making the width (Q) of the pair of pole projections 21a and 21b of the magnetic guide 21 equal to the width (P) of the magnet 14, it is possible to more effectively suppress a change in the bias magnetic field applied to the magnetoresistance element 15 due to a shift or displacement in the position of a detecting member 60.

Embodiment 6

A sixth embodiment of the present invention uses a giant magnetoresistance element (hereinafter simply referred to as "GMR element") as a magnetic detection element.

The GMR element is a layered or stacked product, a so-called "artificial lattice film", which is formed by alternately stacking a plurality of magnetic layers and a plurality of non-magnetic layers each of a thickness of a few angstroms to tens of angstroms. (Fe/Cr)n, (permalloy/Cu/Co/Cu)n, and (Co/Cu)n ("n" is the number of stacked layers) are known as GMR elements. The GMR element has an MR effect (MR change rate) far greater than that of a conventional magnetoresistance element (hereinafter referred to as "MR element"). In addition, the GMR element is an in-plane magnetosensitive element. That is, the magnetic resistance or reluctance of the GMR element depends solely on a relative angle included by the directions of magnetization of the adjacent magnetic layers, so that the GMR element has the same change in resistance with respect to the current flowing through the GMR element irrespective of the direction of an external magnetic field applied thereto relative to the direction of flow of the current. However, the GMR element can have a magnetic anisotropy by narrowing the width of a magnetic reluctance pattern.

Figure 12:
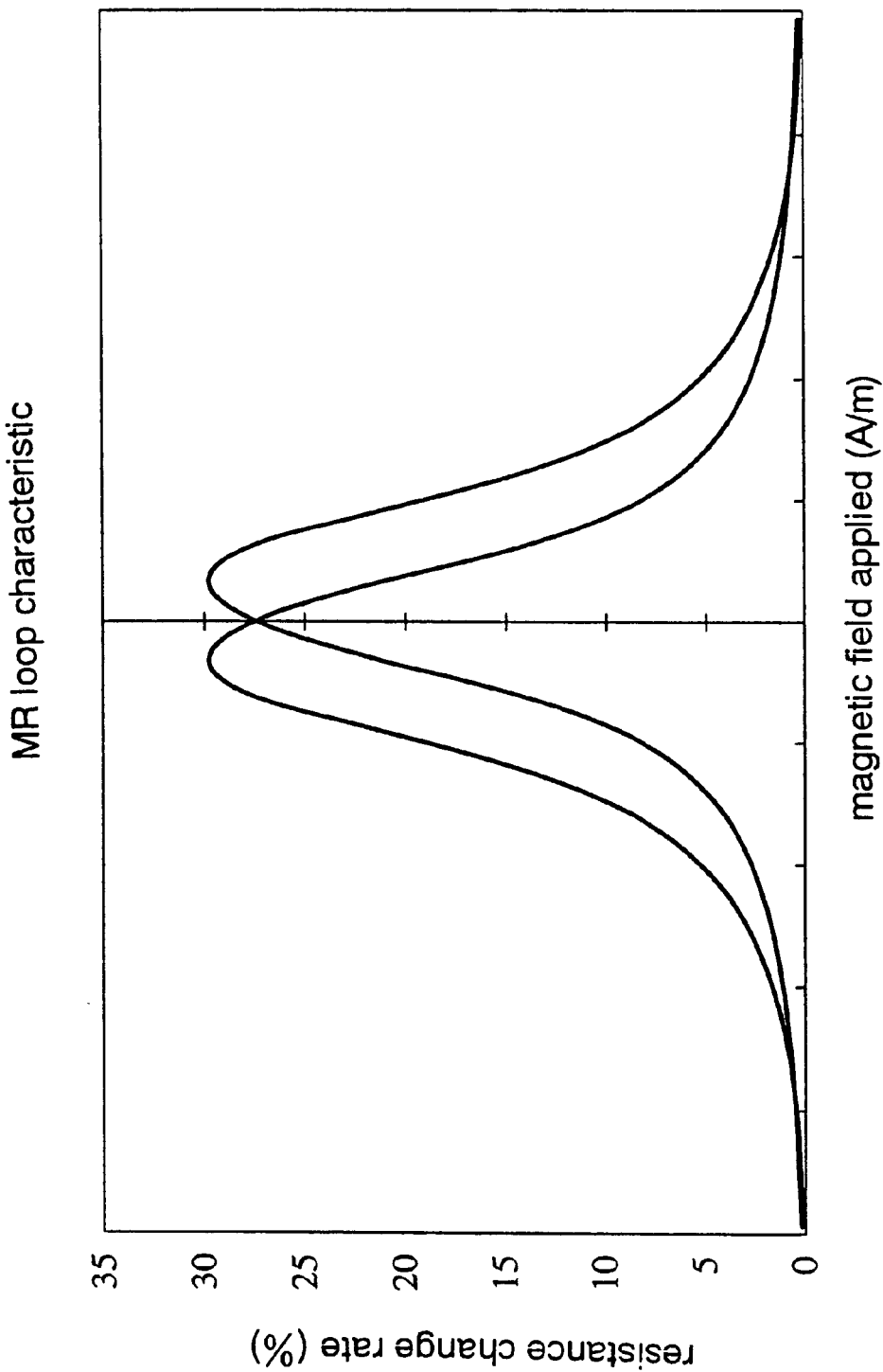
FIG. 12 is a characteristic view of an MR loop in a GMR element.

Moreover, the GMR element has hysteresis in the change in resistance caused by a change in a magnetic field applied thereto, and it also has a temperature characteristic, especially a large temperature coefficient. Note that FIG. 12 illustrates the MR loop characteristic of a GMR element.

In this manner, by using a GMR element as a magnetoelectric conversion element, the signal-to-noise ratio (S/N ratio) can be improved, and noise tolerance can be increased.

Embodiment 7

Figure 13:
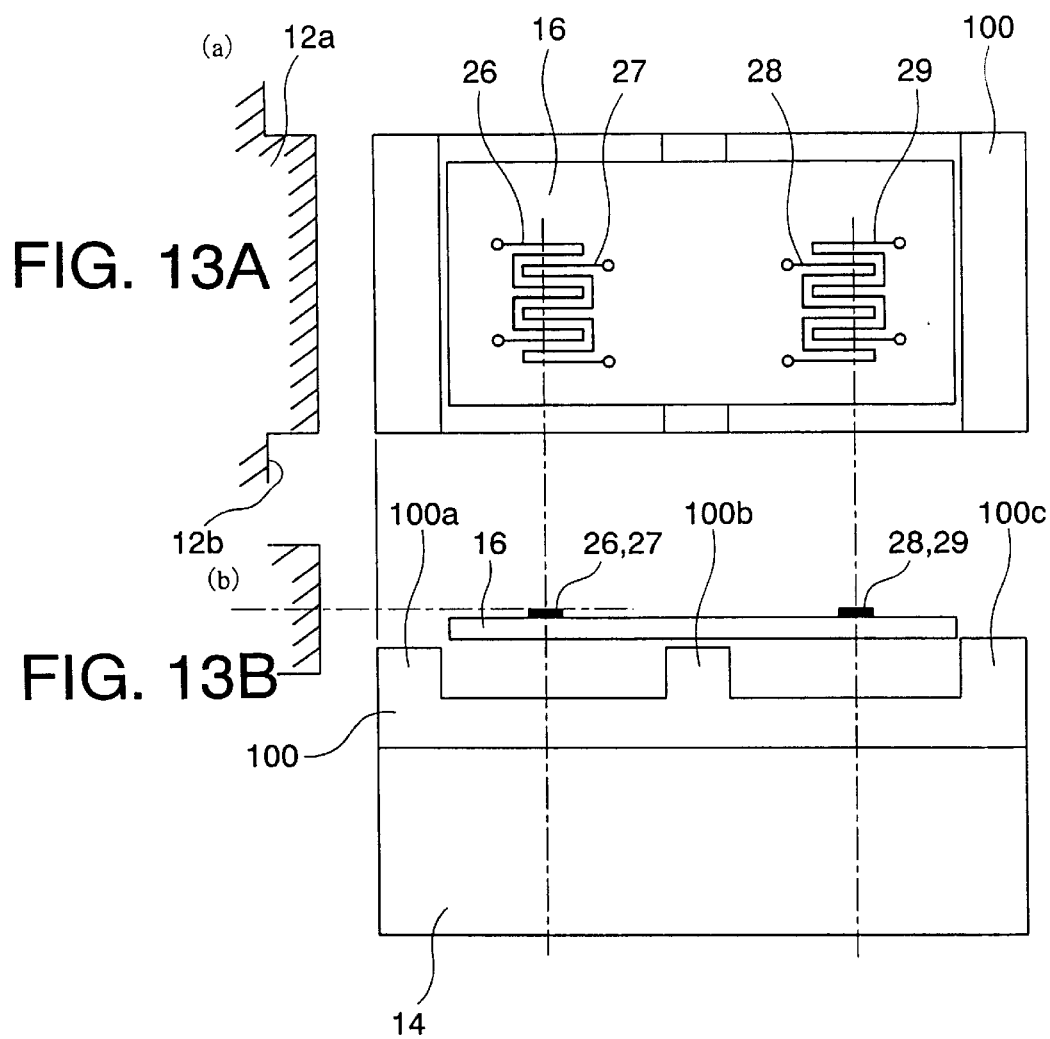
Figure 14:
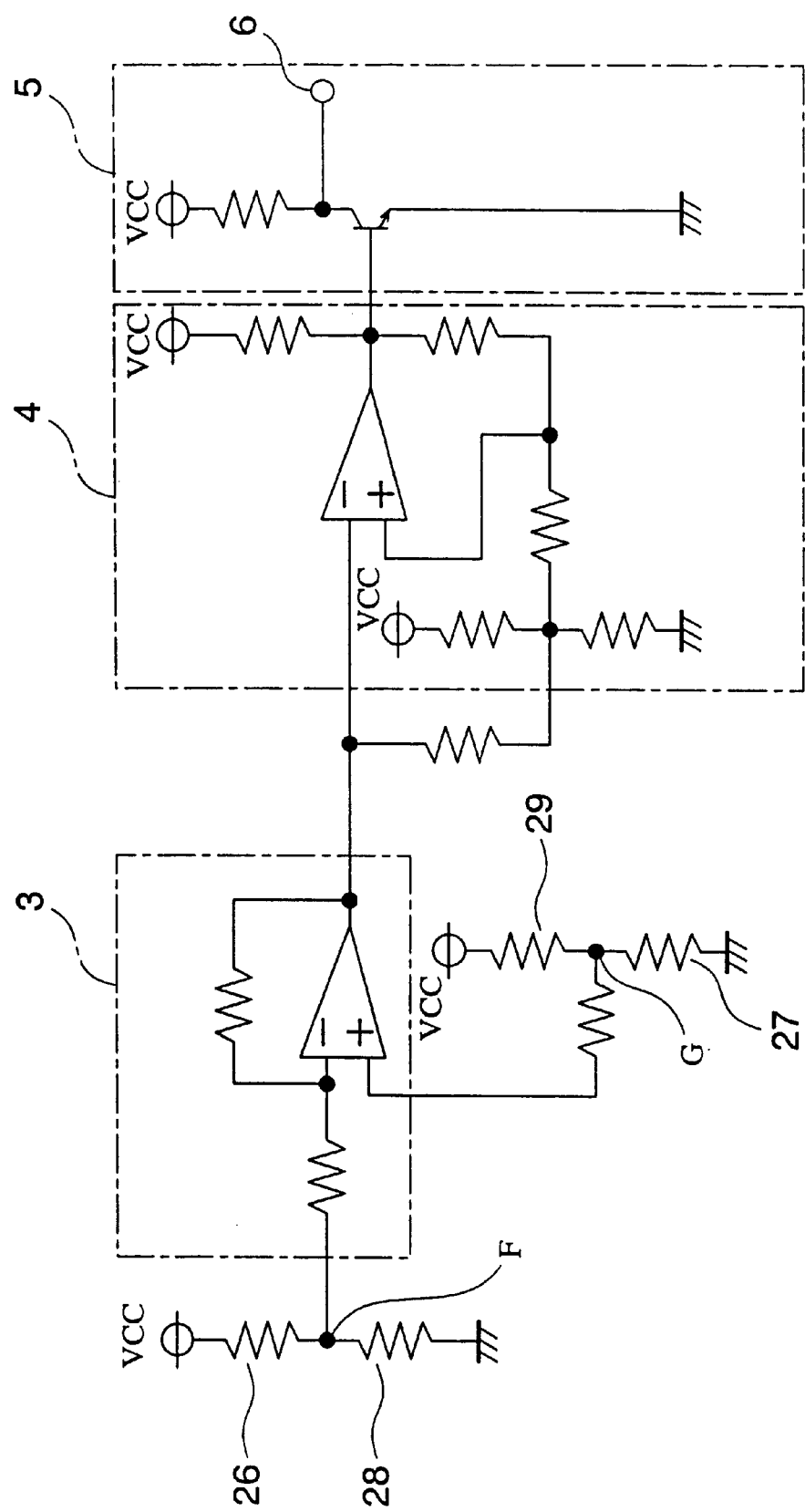
FIG. 14 is an electric circuit diagram of the magnetic detection apparatus illustrated in FIGS. 13A and 13B.

FIGS. 13A and 13B illustrate the arrangement of a magnetic detection apparatus according to a seventh embodiment of the present invention. FIG. 13A is a plan view thereof, and FIG. 13B is a side view thereof. In addition, FIG. 14 is an electric circuit diagram of the magnetic detection apparatus of FIG. 13.

In this embodiment, a magnetic guide 100 has three pole projections, i.e., a first pole projection 100a, a second pole projection 100b and a third pole projection 100c. A first magnetoresistance element 26 and a second magnetoresistance element 27 are disposed between the first pole projection 100a and the second pole projection 100b, and a third magnetoresistance element 28 and a fourth magnetoresistance element 29 are disposed between the second pole projection 100b and the third pole projection 100c.

Figure 15:
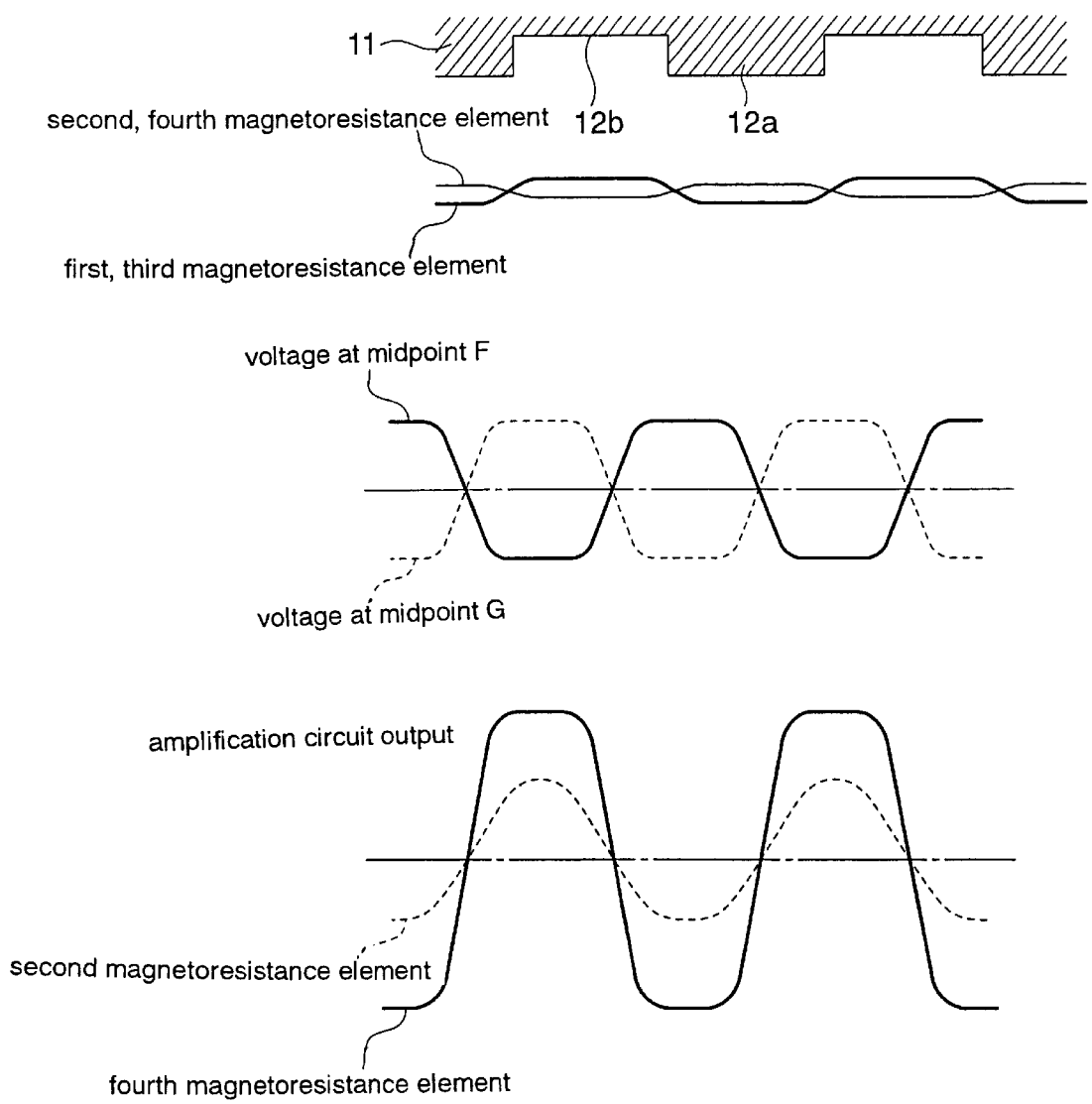
FIG. 15 is an operation waveform diagram of the magnetic detection apparatus according to the sixth embodiment.
Figure 16:
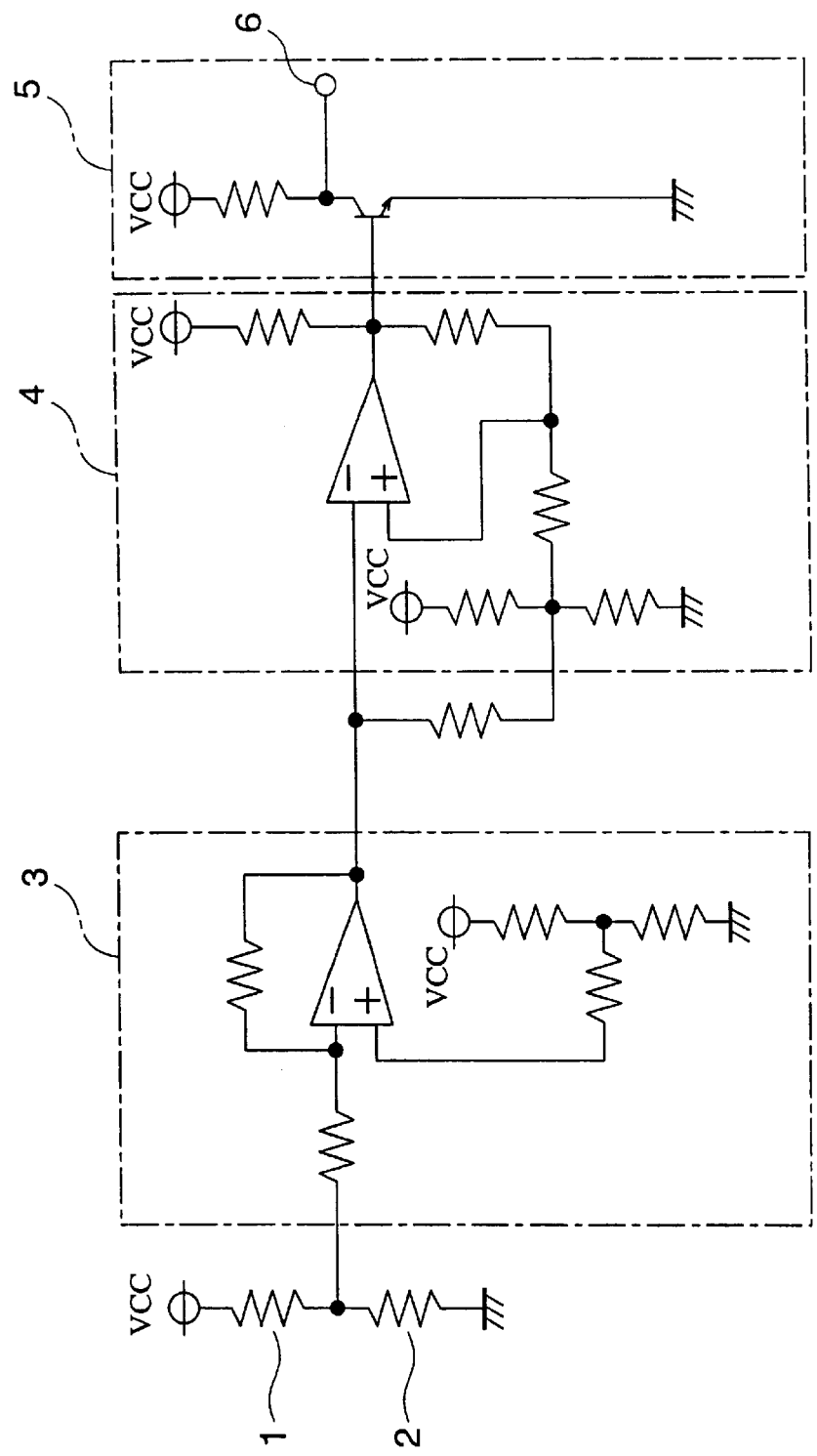
FIG. 16 is an electric circuit diagram of a known magnetic detection apparatus.
Figure 17A:
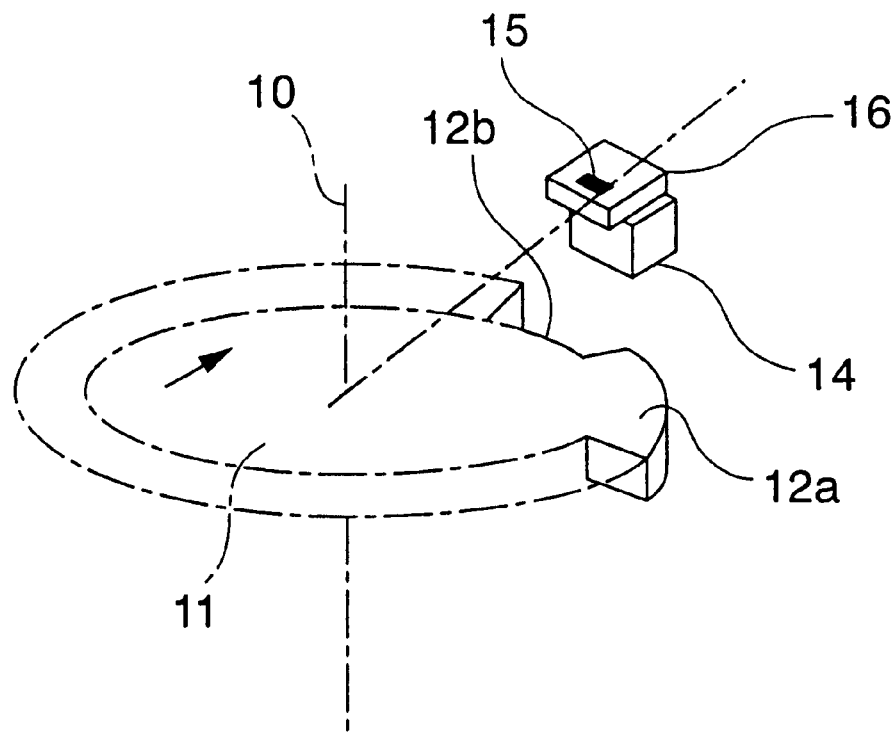
Figure 17B:
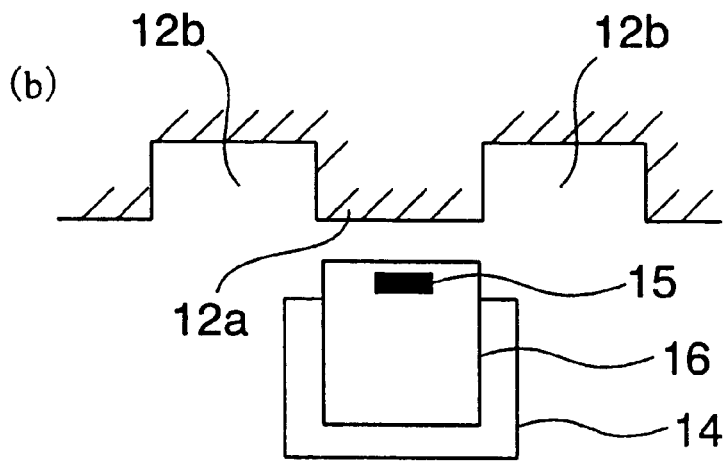
Figure 19A:
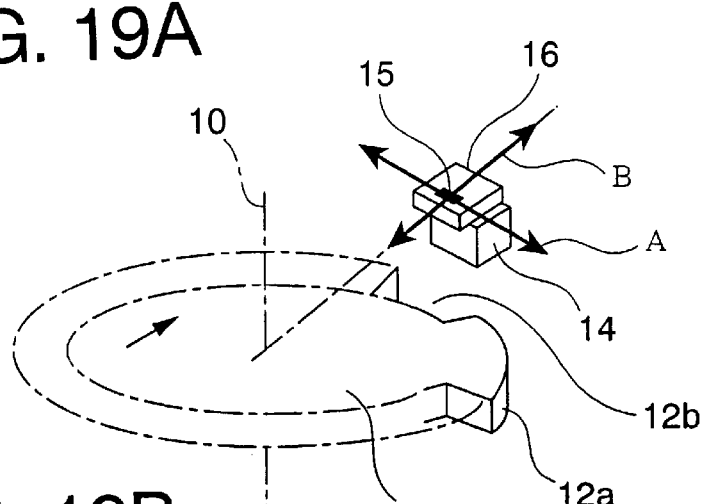
FIG. 19A is a perspective view of the magnetic detection apparatus of FIG. 16.
Figure 19B:
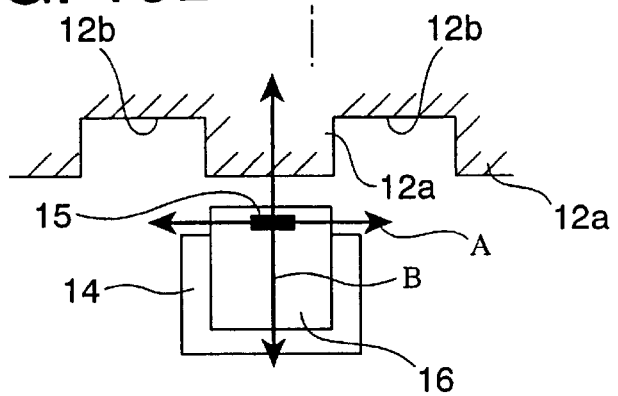
FIG. 19B is a partial plan view of the magnetic detection apparatus of FIG. 19A.
Figure 19C:
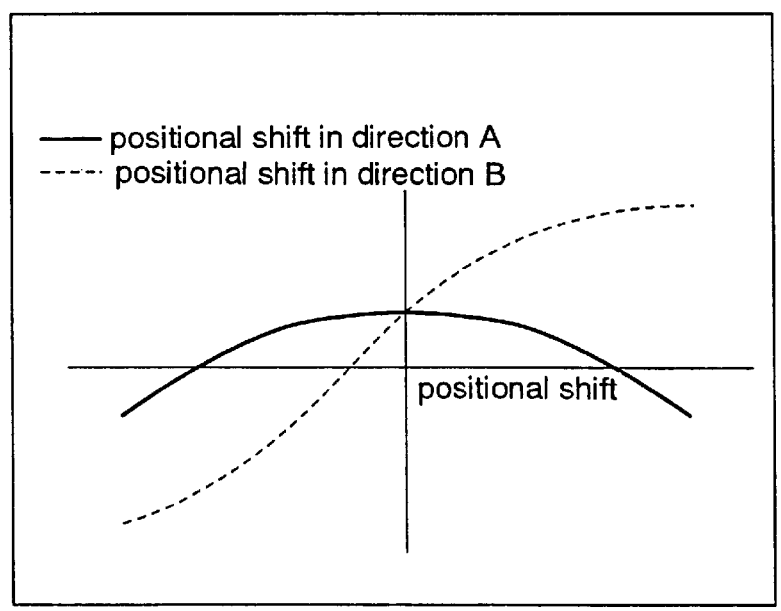
FIG. 19C is a view illustrating a relation between a shift or displacement of the magnetic detection apparatus of FIG. 19A and a magnetic field applied thereto.

FIG. 15 illustrates the operation waveforms of the magnetic detection apparatus of this seventh embodiment. A voltage change at a midpoint G between the second magnetoresistance element 27 and the fourth magnetoresistance elements 29 is the reverse of a voltage change at a midpoint F between the first magnetoresistance element 26 and the third magnetoresistance elements 28. Therefore, it is understood that the output of the amplification circuit is doubled as compared with the case of the third embodiment, and hence the position detection accuracy is accordingly improved.

Although in the above-mentioned respective embodiments, the magnetic moving object has been described as comprising the rotating member, it is of course not limited to such a form but may be any other appropriate form. Moreover, the number of spaces between adjacent pole projections has been shown and described as being only up to two, but the present invention is likewise applicable to the case where there are three or more spaces. In addition, the number of magnetoresistance elements may be four or more.

As described in the foregoing, the following advantages can be obtained according to the present invention.

A magnetic detection apparatus according to the present invention includes: at least one magnetoelectric conversion element disposed to face a detected portion of a magnetic moving object; a magnet with a direction of magnetization thereof oriented in a direction perpendicular to a radial direction of the magnetic moving object in which the magnet faces the magnetic moving object; and a magnetic guide having at least two pole projections formed in a spaced apart relation with respect to each other in a radial direction of the magnetic moving object in which the magnetic guide faces the detected portion of the magnetic moving object; wherein the at least one magnetoelectric conversion element is disposed between the pole projections when viewed from a direction perpendicular to the radial direction of the magnetic moving object in which the magnetic guide faces the detected portion of the magnetic moving object. With the above arrangement, the magnetoelectric conversion element is at a position where there is almost no or little change in a bias magnetic field applied thereto, so that position detection performance is substantially unaffected even when the magnetoelectric conversion element is shifted or displaced in a magnetic moving object facing direction, i.e., in a radial direction of the magnetic moving object. Accordingly, good position detection performance for the detected portion can be ensured even if there takes place a shift or displacement in the position of the magnetoelectric conversion element.

In addition, according to a preferred form of the present invention, the at least one magnetoelectric conversion element is disposed apart from a space between the adjacent pole projections near to or remote from the magnetic moving object when viewed from a direction perpendicular to a radial direction of the magnetic moving object in which the at least one magnetoelectric conversion element faces the detected portion of the magnetic moving object. Thus, the temperature coefficient change characteristic of the magnetoresistance element with respect to a temperature change can be cancelled, whereby excellent performance in detecting the position of a detected portion can be ensured even under temperature fluctuations.

Further, according to another preferred embodiment of the present invention, the magnetic guide has three or more pole projections with the at least one magnetoelectric conversion element being disposed between any adjacent ones of the pole projections, respectively. Thus, it is possible not only to ensure good performance in detecting the position of the detected portion under temperature fluctuations but also enlarge the amplitude of the output of an amplification circuit to thereby improve the detection accuracy. Besides, even if the magnetoelectric conversion element is shifted or displaced in a magnetic moving object facing direction, better position detection performance for the detected portion can be ensured.

Furthermore, according to a further preferred form of the present invention, the magnet has a length in a radial direction of the magnetic moving object, in which the magnetoelectric conversion element faces the detected portion of the magnetic moving object, greater than a distance between the pole projections. With this arrangement, even if the magnetoelectric conversion element is shifted or displaced in a magnetic moving object facing direction, better position detection performance for the detected portion can be ensured, and at the same time the position detection accuracy can be enhanced.

Additionally according to a yet further preferred form of the present invention, the magnetic guide has a width in a direction perpendicular to a radial direction of the magnetic moving object, in which the pole projections face the detected portion of the magnetic moving object, substantially equal to a width of the magnet in a direction perpendicular to a radial direction of the magnetic moving object, in which the magnet faces the detected portion of the magnetic moving object. With this arrangement, even if the magnetoelectric conversion element is shifted or displaced in a circumferential direction of the magnetic moving object, it is possible to ensure better position detection performance for the detected portion.

Besides, according to a still further preferred form of the present invention, the magnetoelectric conversion element comprises a magnetoresistance element. Thus, it is possible to manufacture the magnetic detection apparatus at low cost.

Still more, according to a further preferred form of the present invention, the magnetoelectric conversion element comprises a giant magnetoresistance element. Thus, the signal-to-noise ratio can be improved, thereby enhancing noise tolerance.

What is claimed is:

1. A magnetic detection apparatus comprising:
   at least one magnetoelectric conversion element disposed to face a detected portion of a magnetic moving object;
   a magnet with a direction of magnetization thereof oriented in a direction perpendicular to a radial direction of said magnetic moving object in which said magnet faces said magnetic moving object; and
   a magnetic guide, coupled to said magnet, having at least two pole projections formed in a spaced apart relation with respect to each other in a radial direction of said magnetic moving object in which said magnetic guide faces said detected portion of said magnetic moving object;
   wherein said at least one magnetoelectric conversion element is disposed between said pole projections when viewed from a direction perpendicular to said radial direction of said magnetic moving object in which said magnetic guide faces said detected portion of said magnetic moving object.

2. The magnetic detection apparatus according to claim 1, wherein said at least one magnetoelectric conversion element is disposed on one side of a center between said adjacent pole projections near to or remote from said magnetic moving object when viewed from a direction perpendicular to a radial direction of said magnetic moving object in which said at least one magnetoelectric conversion element faces said detected portion of said magnetic moving object.

3. The magnetic detection apparatus according to claim 1, wherein said magnetic guide has three or more pole projections with said at least one magnetoelectric conversion element being disposed between any adjacent ones of said pole projections, respectively.

4. The magnetic detection apparatus according to claim 1, wherein said magnet has a length in a radial direction of the magnetic moving object, in which the magnetoelectric conversion element faces said detected portion of said magnetic moving object, greater than a distance between said pole projections.

5. The magnetic detection apparatus according to claim 1, wherein said magnetic guide has a width in a direction perpendicular to a radial direction of said magnetic moving object, in which said pole projections face said detected portion of said magnetic moving object, substantially equal to a width of said magnet in a direction perpendicular to a radial direction of said magnetic moving object, in which said magnet faces said detected portion of said magnetic moving object.

6. The magnetic detection apparatus according to claim 1, wherein said magnetoelectric conversion element comprises a magnetoresistance element.

7. The magnetic detection apparatus according to claim 1, wherein said magnetoelectric conversion element comprises a giant magnetoresistance element.

* * * * *